United States Patent [19]
Shiragaki

[11] Patent Number: 6,128,115
[45] Date of Patent: Oct. 3, 2000

[54] OPTICAL SWITCH DEVICE

[75] Inventor: Tatsuya Shiragaki, Tokyo, Japan

[73] Assignee: NEC Corporation, Tokyo, Japan

[21] Appl. No.: 09/038,821

[22] Filed: Mar. 12, 1998

[30] Foreign Application Priority Data

Apr. 3, 1997 [JP] Japan .................................. 9-085085

[51] Int. Cl.[7] .......................... H04B 10/00; H04B 10/02; H04J 14/02
[52] U.S. Cl. .......................... 359/128; 359/117; 359/127
[58] Field of Search .................................. 359/123, 124, 359/127, 128, 140

[56] References Cited

U.S. PATENT DOCUMENTS

| | | | |
|---|---|---|---|
| 5,005,166 | 4/1991 | Suzuki | 370/1 |
| 5,438,445 | 8/1995 | Nakano | 359/124 |
| 5,627,925 | 5/1997 | Alferness | 385/17 |
| 5,953,142 | 9/1999 | Chiaroni et al. | 359/127 |

FOREIGN PATENT DOCUMENTS

| | | |
|---|---|---|
| 60-263596 | 12/1985 | Japan . |
| 6-188517 | 7/1994 | Japan . |

OTHER PUBLICATIONS

Japanese Office Action, dated Nov. 24, 1998, with English language translation of Japanese Examiner's comments.
T. Shiragaki et al., "Optical Cross–Connect System Using Fixed–Wavelength Converters to Avoid Wavelength Blocking", First Optoelectronics and Communications Conference, Technical Digest, Jul. 1996.
S. Takahashi et al., "Space–Division Optical Cell Switching with 8×8 Gate Type Matrix Employing Gate Turn–on–Delay Compensator", 1996 International Topical Meeting on Photonics Switching Technical Digest, vol. 2, PthC 1, pp. 12–15, 1996.
Zhou, et al., "Four–Wave Mixing Wavelength Conversion Efficiency in Semiconductor Traveling–Wave Amplifiers Measured to 65nm of Wavelength Shift", IEEE Photonics Technology Letters, vol. 6, No. 8, Aug. 1994.
Marcenac et al., "Bandwith Enhancement of Wavelength Conversion Via Cross–Gain Modulation by Semiconductor Optical Amplifier Cascade", Electronics Letters, vol. 31, No. 17, Aug. 17, 1995.
Mikkelsen et al., "All–Optical Noise Reduction Capability of Interferometric Wavelength Converters", Electronics Letters, vol. 32, No. 6, Mar. 14, 1996.
Yasaka et al., "Broad–Range Wavelength Conversion of 10Gbit/s Ssignal Using a Superstructure Grating Distributed Bragg Reflector Laser", Electronics Letters, vol. 30, No. 2, Jan. 20, 1994.

*Primary Examiner*—Jason Chan
*Assistant Examiner*—Agustin Bello
*Attorney, Agent, or Firm*—McGuire Woods, LLP

[57] ABSTRACT

An optical switch device includes an integrated space switch section and a wavelength switch section which reduces, a packaging volume and cost. The optical switch device includes a plurality of multi-functional wavelength converters. One of these converters includes a wavelength converter 121, in which an input terminal and an output terminal are connected to optical divider 131 and opticalcoupler 141, respectively, is operated as the wavelength converter only when a current flows through a semiconductor optical amplifier in the wavelength converter. When the current does not flow through the amplifier, the light is not outputted. By turning on/off the current flowing through the semiconductor optical amplifier in the wavelength converter, wavelength converter 121 can functions as a gate switch. The switch device has both of a wavelength conversion function and a space switch function. Wavelength converters 121–123 connected to one optical divider 131 are connected to different opticalcouplers 141–143, respectively, whereby the device can also have a wavelength multiplexing function.

16 Claims, 3 Drawing Sheets

→ OPTICAL FLOW
— ELECTRIC WIRING

OPTICAL SWITCH DEVICE

BACKGROUND OF THE INVENTION

1. Field of the Invention

The present invention relates to an optical switch device for use in optical communication.

2. Description of the Related Art

In an optical communication network, wavelength multiplexing is performed whereby transmission capacity can be increased in a single optical transmission line. It should be noted that an optical signal of the same wavelength cannot be multiplexed in the same optical transmission line. Thus, when the multiplexing of optical signals of the same wavelength is desired, each node is required to convert the wavelength by a wavelength switch. Each node is also required to flexibly change the capacity in response to demand between any two nodes. Therefore, each node needs to function as a space switch. As described above, the fact that an optical communication network node needs a space switch function and a wavelength switch function is disclosed in, for example, a cited reference (T. Shiragaki et al., entitled "Optical Cross-connect System using Fixed-Wavelength Converters to Avoid Wavelength Blocking", First Optoelectronics and Communications Conference (OECC '96), Technical Digest, PD1–5, pp. 10–11, 1996).

Heretofore, a method of realizing both of the space switch function and the wavelength switch function has needed to provide a space switch section and a wavelength switch section independently of each other. FIG. 1 is a block diagram of a prior-art optical switch device.

FIG. 1 shows an example of a 3-input/3-output type (hereinafter referred to as 3×3 gate type) optical switch device. Space switch section 607 and wavelength switch section 608 are disposed independently of each other.

In space switch section 607, semiconductor optical amplifiers are used for optical gate switches. When a current flows through a semiconductor optical amplifier, the amplifier has a gain. When the current does not flow, the amplifier does not have a gain and input light is thus absorbed. A gate switch operation, that is, an on/off operation can be therefore performed by the semiconductor optical amplifier. This characteristic of a semiconductor optical amplifier gate switch (hereinafter referred to as SOAG) 604 is used, in which the space switch is constituted as described below. The optical signal to be inputted to input terminal 601 is divided into three by optical divider 603. The divided signals are connected to three SOAGs 604. Output terminals of the three SOAGs 604 connected to the same optical divider are connected to three different opticalcouplers 605 (cross connection) as shown in FIG. 1. Outputs of opticalcouplers 605 are connected to the output terminals. SOAG 604 is turned on/off, whereby a single optional optical signal alone can be inputted to one opticalcoupler 605. Since SOAGs 604 intervene in routes composed of all combinations of the connections between input terminals 601 and output terminals 602, all the combinations of switching statuses can be generated. Space switch section 607 functions as the 3×3 gate type space switch. The SOAG and the space switch using the SOAG are described in, for example, the cited reference (S. Takahashi et al., entitled "10 Fb/s/ch Space-Division Optical Cell Switching with 8×8 Gate Type Switch Matrix Employing Gate Turn-on-Delay Compensator", 1996 International Topical Meeting on PHOTONICS IN SWITCHING Technical Digest Vol. 2, PThC 1, pp. 12–15, 1996).

For a wavelength multiplexing transmission, the optical signal to be multiplexed must have different wavelengths in a single optical fiber. In order that the optical signal outputted from space switch section 607 is transmitted by multiplexing the wavelength thereof, a wavelength conversion is therefore necessary in such a manner that the same wavelength is not multiplexed. Therefore, in FIG. 1, the output of space switch section 607 is inputted to wavelength switch section 608, whereby the wavelength conversion is required. Wavelength converter 606 can be constituted by using a four-wave mixing (for example, see the cited reference: J. Zhou et al., entitled "Four-Wave Mixing Wavelength Conversion Efficiency in Semiconductor Traveling-Wave Amplifiers Measured to 65 nm of Wavelength Shift", IEEE Photon Technol. Lett., vol. 6, no. 8, pp. 984–987, 1994); a cross-gain modulation (for example, see the cited reference: D. D. Marcenac, et al., entitled "Bandwidth enhancement of wavelength conversion via cross-gain modulation by semiconductor optical amplifier cascade", Electron Lett., vol. 31, no. 17, pp. 1442–1443, 1995); a cross-phase modulation (for example, see the cited reference: B. Mikkelsen et al., entitled "All-optical noise reduction capability of Interferometric wavelength converters", Electron Lett., vol. 32, no. 6, pp. 566–567, 1996) or the like. An output light from output terminal 602 of wavelength switch section 608 is inputted to a wavelength multiplexer (not shown) and the wavelength is multiplexed, whereby the wavelength-multiplexed optical signal can be transmitted to other node.

As described above, the optical switch device constituted as shown in FIG. 1 is used, whereby each node can obtain a wavelength conversion function and a switch function. However, in this constitution, the space switch section and the wavelength switch section must be prepared independently of each other. A packaging volume of the optical switch device is thus increased. Disadvantageously, this increases a cost.

SUMMARY OF THE INVENTION

It is an object of the present invention to provide an optical switch device in which a space switch section and a wavelength switch section are integrated with each other whereby packaging volume is thus reduced and cost is reduced.

According to one aspect of the present invention, an optical switch device comprises: a plurality of optical divider means; a plurality of wavelength converter means capable of switching/setting a mode for outputting light and a mode not for outputting light; a plurality of opticalcoupler means; a plurality of input terminals; and a plurality of output terminals. The plurality of input terminals are connected to said plurality of optical divider means. The plurality of optical divider means are connected to said plurality of wavelength converter means. The plurality of wavelength converter means are connected to said plurality of opticalcoupler means. The plurality of opticalcoupler means are connected to said plurality of output terminals.

According to another aspect of the present invention, the optical switch device comprises: a plurality of optical divider means; a plurality of wavelength converter means capable of switching/setting the mode for outputting the light and the mode not for outputting the light; a plurality of input terminals; and a plurality of output terminals. The plurality of input terminals are connected to said plurality of optical divider means. The plurality of optical divider means are connected to said plurality of wavelength converter means. The plurality of wavelength converter means are connected to said plurality of output terminals.

According to a still another aspect of the present invention, the optical switch device comprises: a plurality of wavelength converter means capable of switching/setting the mode for outputting the light and the mode not for outputting the light; a plurality of opticalcoupler means; a plurality of input terminals; and a plurality of output terminals. The plurality of input terminals are connected to said plurality of wavelength converter means. The plurality of wavelength converter means are connected to said plurality of opticalcoupler means. The plurality of opticalcoupler means are connected to said plurality of output terminals.

The wavelengths of the lights outputted from said plurality of wavelength converter means connected to the same one of said plurality of opticalcoupler means may be different from each other. Each of said plurality of opticalcoupler means has a plurality of input terminals and a single output terminal. The plurality of input terminals of the same plurality of opticalcoupler means transmit the input light of different/inherent transmittable wavelength. The light is outputted to the output terminal. The light outputted from the plurality of wavelength converter means connected to the plurality of input terminals may have the same wavelength as the inherent transmittable wavelength.

The device may further comprise controller means for tuning the wavelength of the output light from said plurality of wavelength converter means so that the wavelengths of the lights outputted from said plurality of wavelength converter means connected to said plurality of input terminals of the same one of said plurality of opticalcoupler means may be different from each other.

Each of said plurality of optical divider means may have a function for outputting the wavelength multiplexed input light as the light of different wavelengths to the spatially different output terminals.

A function of the optical switch device of the present invention will be described below. A semiconductor optical amplifier is used as a wavelength converter. That is, the light is inputted to the semiconductor optical amplifier. A four-wave mixing, a cross-gain modulation, a cross-phase modulation or the like is performed in the semiconductor amplifier, whereby the wavelength is converted. Only when a current flows through the amplifier, the amplifier is operated as the wavelength converter, whereby the light is outputted. When the current does not flow, the light is not outputted. Therefore, by turning on/off the current flowing through the semiconductor optical amplifier in the wavelength converter, the wavelength converter can function as a gate switch. The wavelength converter is located between an optical divider and a opticalcoupler. A gate operation performed, whereby the switch device can have both a wavelength conversion function and a space switch function.

The above and other object, features and advantages of the present invention will become apparent from the following description based on the accompanying drawings which illustrate an example of preferred embodiments of the present invention.

PREFERRED EMBODIMENTS

Figure 1:
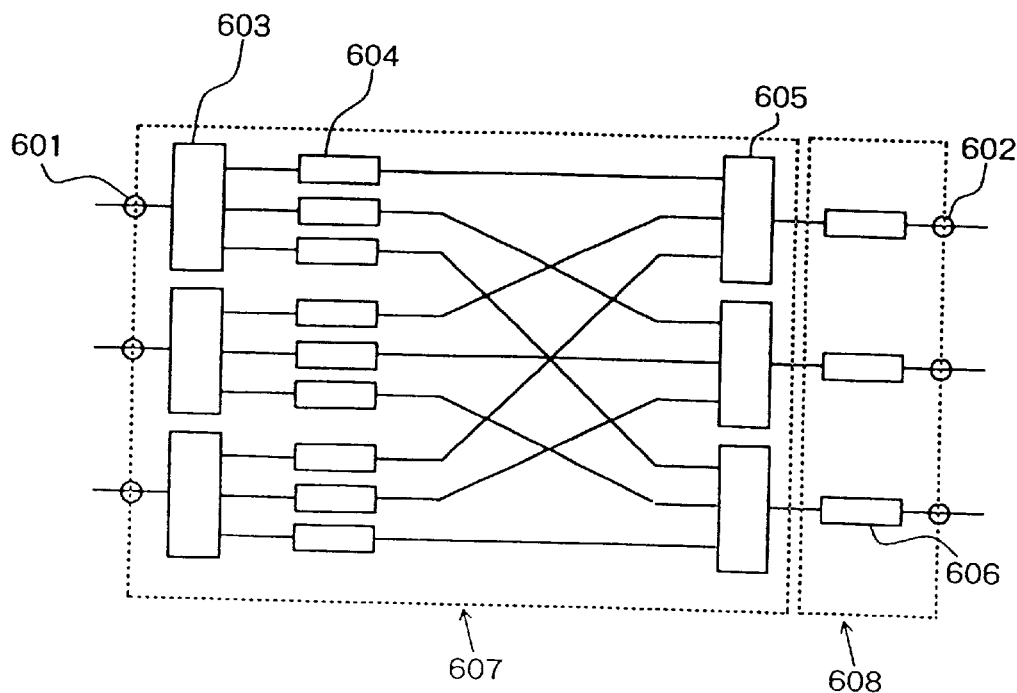
FIG. 1 is a block diagram of the prior-art optical switch device.
Figure 2:
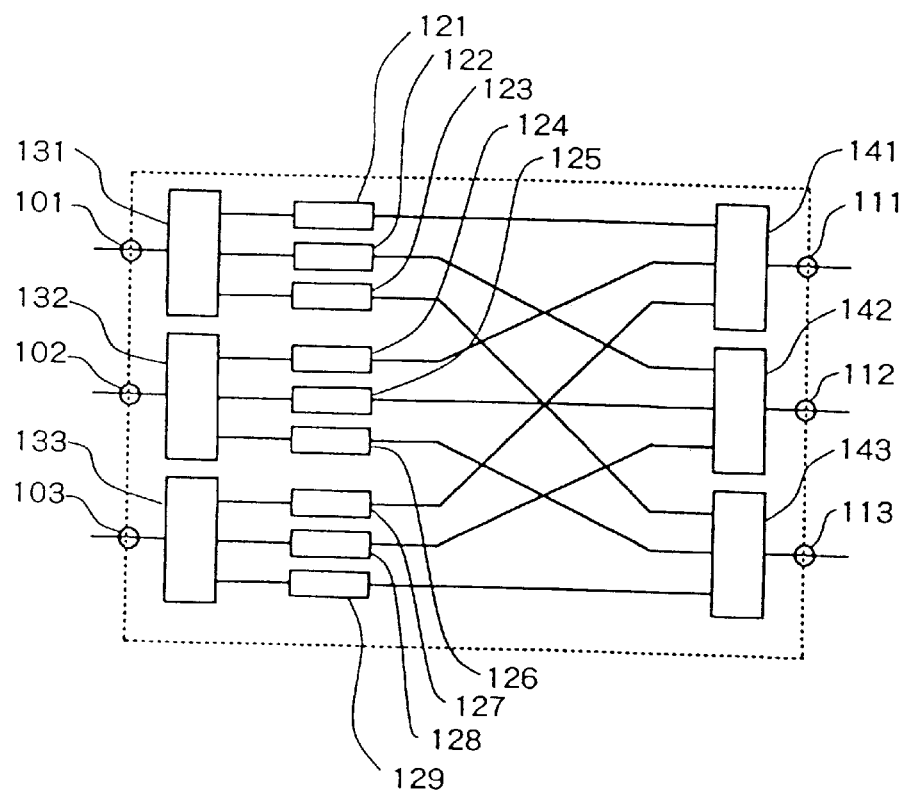
FIG. 2 is a block diagram of the optical switch device having a 3×3 gate type space switch function and a wavelength conversion function according to a first embodiment of the present invention.

An optical switch device of a first embodiment of the present invention will be described below with reference to the accompanying drawings. FIG. 2 is a block diagram of a optical switch device having a 3×3 gate type space switch function and a wavelength conversion function according to the first embodiment of the present invention.

Wavelength converter means, wavelength converters 121–129 are wavelength converters using four-wave mixing, a cross-gain modulation or a cross-phase modulation of a semiconductor optical amplifier (see the cited references of the prior arts). A wavelength converter employing a semiconductor optical amplifier is used. In this case, when a current flows through the semiconductor optical amplifier and thus the amplifier has a gain, a wavelength conversion is caused. The converted light is then outputted from the wavelength converter. A mode for outputting the light is set. On the other hand, the current does not flow through the semiconductor optical amplifier of the wavelength converter, whereby the mode is set so that the light may not be outputted from the wavelength converter.

A constitution example of wavelength converter 121 will be described below with reference to FIG. 3.

Figure 3:
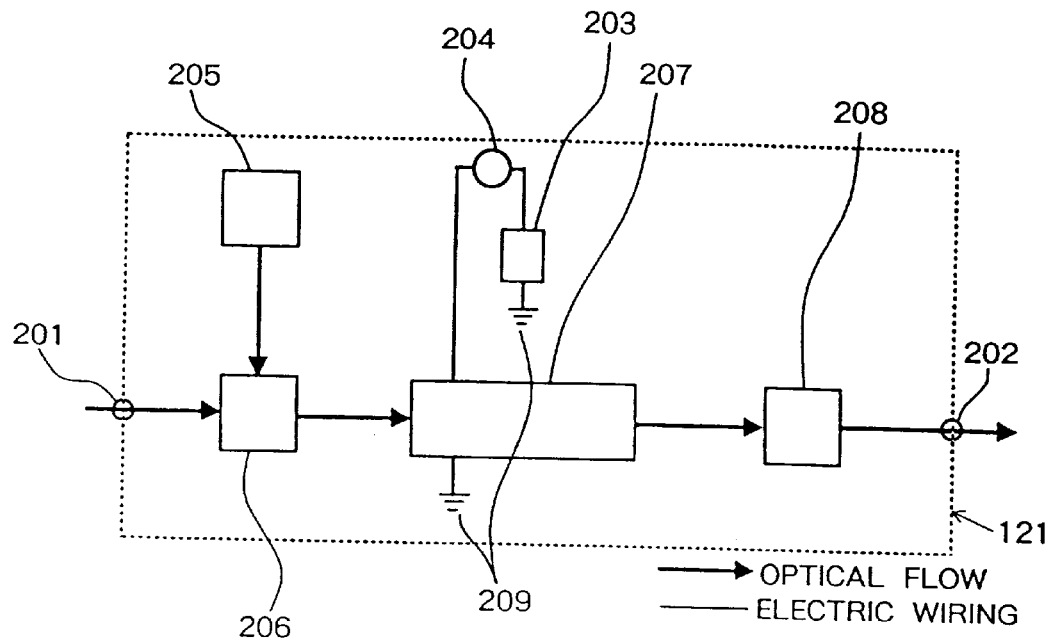
FIG. 3 is a block diagram of a wavelength converter using a cross-gain modulation for use in the first embodiment.

FIG. 3 is a block diagram of the wavelength converter using the cross-gain modulation for use in the first embodiment.

The current flows through semiconductor optical amplifier 207, whereby amplifier 207 has gain.

Current supply means 204 for supplying current to semiconductor optical amplifier 207 comprises a current source or a voltage source and a drive circuit of a semiconductor laser. Current supply means 204 can be switched to a current supply status (On status) and a current shut-off status (Off status) by electric switch 203. An electromagnetic switch such as a relay, a semiconductor analog/digital switch or the like can be used for electric switch 203. A resistance value or the like is changed in the drive circuit, whereby the current does not flow. This also permits an electric switch function. Optical amplifier 207 and electric switch 203 are grounded by ground 209.

Opticalcoupler 206 for coupling two input lights together couples the light from semiconductor laser 205 to the light inputted from input terminal 201.

The coupled light is inputted to semiconductor optical amplifier 207. Tunable wavelength filter 208 selects a certain wavelength alone. Filter 208 outputs the selected wavelength to output terminal 202. An interference film filter can be used for tunable wavelength filter 208.

The wavelength conversion using an effect of the cross-gain modulation will be briefly described with reference to FIG. 3. Turning on electric switch 203 allows the current to flow through semiconductor optical amplifier 207, whereby amplifier 207 is allowed to have the gain. A continuous wave oscillating light is emitted from semiconductor laser 205 into semiconductor optical amplifier 207, whereby semiconductor optical amplifier 207 is saturated. The digitally/intensely modulated input signal light is emitted into amplifier 207. When the mark of input signal light logical bit value is 1, the gain with respect to the wavelength from semiconductor laser 205 is reduced due to a stimulated emission by the input signal light. The light of the wavelength of semiconductor laser 205 is not outputted from semiconductor optical amplifier 207 or the light is reduced. During a space when the input signal light logical bit value is 0, the light of semiconductor laser 205 is saturated by semiconductor optical amplifier 207, whereby the saturated light is outputted. Therefore, when the filter for transmitting an oscillation wavelength alone of semiconductor laser 205 is used as wavelength filter 208, the wavelength of the input signal light is converted from the wavelength of the input light to the wavelength of semiconductor laser 205. An optical signal, in which the bit logic of the input signal light is inverted, is also outputted from wavelength filter 208 to output terminal 202.

A method of operating the wavelength converter as a gate switch will be described below with reference to FIG. 3. When electric switch 203 is turned on, a gate is opened (turned on) and the optical signal is outputted. This allows semiconductor optical amplifier 207 to have the gain so that the wavelength conversion may be performed. When electric switch is turned off, the gate is closed (turned off) and the optical signal is not outputted. The input light to semiconductor optical amplifier 207 is thus absorbed in semiconductor optical amplifier 207, whereby the light is not outputted from semiconductor optical amplifier 207.

Although wavelength converter 121 is described above with reference to FIG. 3, other wavelength converters 122–129 are also constituted in the same manner as wavelength converter 121. Wavelength converters 122–129 perform the same wavelength conversion operation and gate switch operation.

The following description is provided for the 3×3 gate type space switch operation of the optical switch device of the constitution shown in FIG. 2 using the wavelength converter functioning as the gate switch. The optical signals inputted to input terminals 101–103 are divided into three by optical dividers 131–133 connected to the respective input terminals. The signals are connected to wavelength converters 121–129. The output terminals of the wavelength converters connected to the same optical divider, for example, wavelength converters 121–123 connected to optical divider 131 are connected to opticalcouplers 141–143, respectively (cross connection: see FIG. 2). In the same manner, wavelength converter 124 connected to optical divider 132 is connected to opticalcoupler 141. Wavelength converter 125 is connected to opticalcoupler 142. Wavelength converter 126 is connected to opticalcoupler 143. Wavelength converters 127, 128, 129 connected to optical divider 133 are also connected in the same manner. Wavelength converter 129 is connected to opticalcoupler 143. The outputs of opticalcouplers 141–143 are connected to output terminals 111–113, respectively.

Such a connection allows electric switch 203 of each wavelength converter to be turned on/off, whereby a single optical signal alone can be inputted to each opticalcoupler. The wavelength converter intervenes in all routes of the connections between the input terminals and the output terminals. It is thus possible to generate switching statuses corresponding to all the connections composed of the combinations between the input terminals and the output terminals. The following specific description is provided with reference to FIG. 2. Wavelength converter 121 in which the optical signal is inputted from input terminal 101, wavelength converter 124 in which the optical signal is inputted from input terminal 102 and wavelength converter 127 in which the optical signal is inputted from input terminal 103 are connected to opticalcoupler 141. When the wavelength-converted optical signal from input terminal 102 is outputted to output terminal 111, wavelength converters 121 and 127 are turned off and wavelength converter 124 is turned on. The same operation has only to be performed. That is, the wavelength converter alone connected to the input terminal to be outputted to a certain output terminal is turned on, and the wavelength converters connected to the input terminals not to be outputted to the output terminal are turned off.

As described above, the wavelength converter using the semiconductor optical amplifier can be used as the space switch.

Therefore, the space switch can be constituted by using the wavelength converter as the gate switch. As shown in FIG. 2, the wavelength converter functioning as the gate switch is located between the optical divider and the opticalcoupler. Thus, it is possible to constitute the optical switch device having both of the space switch function and the wavelength conversion function.

The optical switch device of a second embodiment of the present invention will be described below with reference to FIG. 2. In the optical switch device of the first embodiment, the wavelength converter is used so that output wavelengths of the wavelength converters connected to the same opticalcoupler may be different from each other, whereby the optical switch device can have a wavelength multiplexing function. For example, in FIG. 2, the wavelength converters connected to opticalcoupler 141 are wavelength converters 121, 124, 127. The wavelength converters are used so that the output optical signals of wavelength converters 121, 124, 127 may have the wavelengths of $\lambda 1$, $\lambda 2$ and $\lambda 3$, respectively. In this case, the wavelengths are coupled to one another by opticalcoupler 141. The wavelengths of $\lambda 1$, $\lambda 2$ and $\lambda 3$ are then multiplexed and outputted to output terminal 111. As described above, the wavelength converter, in which the converted wavelength is different and fixed, is used as the wavelength converters connected to the input terminals of the same opticalcoupler in such a manner that the same wavelength is not multiplexed when the wavelength is multiplexed in the output terminal. Thus, the optical signals of the same wavelength are not coupled to each other in a single output terminal. For the wavelength converter for outputting the light alone of a specific wavelength, a fixed oscillated-wavelength semiconductor laser such as a distributed feedback laser is used as a semiconductor optical laser for use in wavelength converter 121 of FIG. 3, whereby the wavelength conversion may be performed by the cross-gain modulation (as an example of a fixed oscillated wavelength converter, see the cited reference: T. Shiragaki et al., entitled "Optical Cross-connect System using Fixed-Wavelength Converters to Avoid Wavelength Blocking", First Optoelectronics and Communications Conference (OECC '96), Technical Digest, PD1–5, pp. 10–11, 1996). This optical switch device can be said to be a switch having a spatial switch, a wavelength switch function and a wavelength multiplexing function.

The optical switch device of a third embodiment will be described below with reference to FIG. 2. A wavelength multiplexer such as a grating having a transmittable wavelength and an arrayed waveguide grating (AWG) is used as opticalcouplers 141-143 of the second embodiment. The wavelength of the light, which is outputted to the output terminal with the least optical loss in the lights inputted to the input terminals of the wavelength multiplexer, is referred to as a "multiplexer-input-wavelength". As wavelength converters 121–129, used is the wavelength converter which has the output wavelength so that the output wavelength of the wavelength converter connected to the input terminal of the wavelength multiplexer may correspond to the multiplexer-input-wavelength of the input terminal of the wavelength multiplexer. By the use of the optical switch device having the opticalcoupler employing such a wavelength multiplexer, it is possible to obtain the wavelength multiplexing function as well as the space switch function and the wavelength switch function. The optical switch device can be also constituted with low loss. Moreover, a filter action of the opticalcoupler allows an optical noise to be reduced for the following reason. That is, since a certain input terminal of the wavelength multiplexer transmits the fixed wavelength, other wavelengths to be the optical noise are cut off and the remaining wavelength is then outputted to the opticalcoupler.

Figure 4:
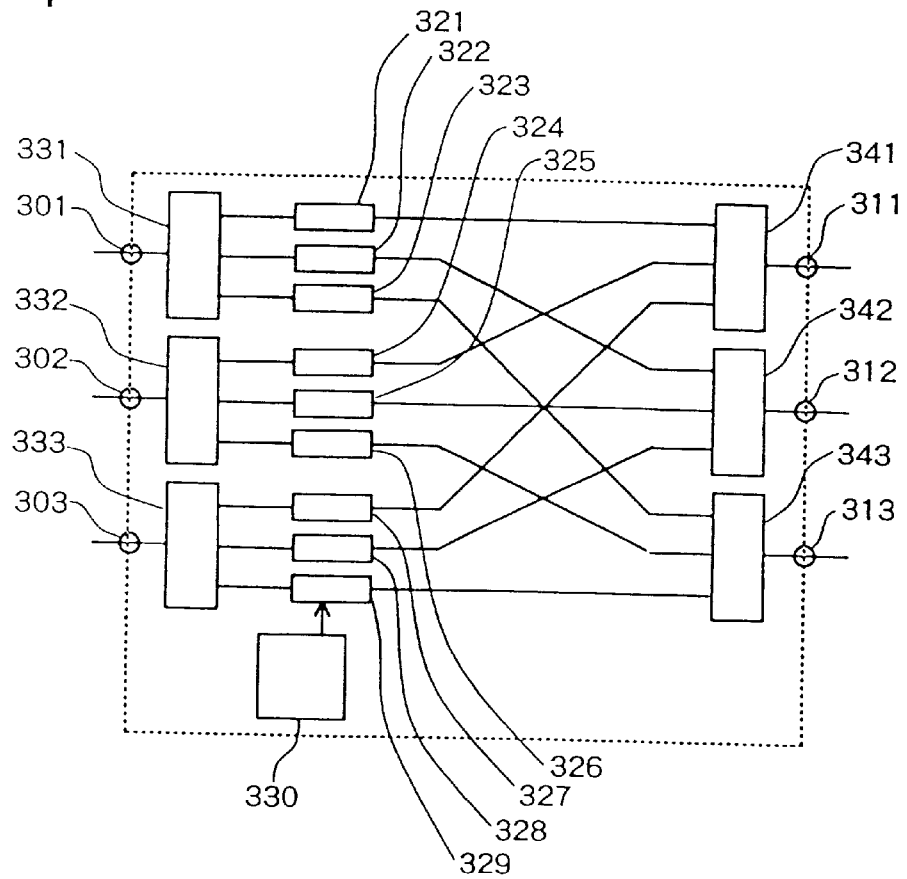
FIG. 4 is a block diagram of the optical switch device having the 3×3 gate type space switch function and the wavelength conversion function according to a fourth embodiment of the present invention.

The optical switch device of a fourth embodiment will be described below with reference to FIG. 4. FIG. 4 is a block diagram of the optical switch device having the 3×3 gate type space switch function and the wavelength conversion function according to the fourth embodiment of the present invention.

In the fourth embodiment, the wavelength converters of the first embodiment are replaced by the wavelength converters whose output light has a tunable wavelength. Controller 330 for controlling the output wavelength of the wavelength converters is added to wavelength converters 321–329 so that the optical signal of the same wavelength may be not inputted to output terminals 311–313 of the optical switch device.

In order to make the output wavelength of the wavelength converters tunable, a tunable wavelength semiconductor laser may be used as semiconductor laser 205 in wavelength converter 121 of FIG. 3. As the tunable wavelength semiconductor laser, for example, an SSG/DBR laser disclosed in the cited reference (H.

Yasaka et al., entitled "Broad-range wavelength conversion of 10 Gb/s signal using a super structure grating distributed Bragg reflector laser", Electron Lett., vol. 30, pp. 133–134, 1994) can be used. Since the constitution and function of optical dividers 331–333 connected to input terminals 301–303 and opticalcouplers 341–343 connected to output terminals 311–313 are the same as those of the first embodiment, the description is omitted. The fourth embodiment is used, whereby the space switch function and the wavelength switch function can be realized at low cost and with space saved. Furthermore, the wavelength multiplexing function can be realized.

The optical switch device of a fifth embodiment will be described below with reference to FIG. 4. In the fifth embodiment of the present invention, in the constitution described in the fourth embodiment, a wavelength multiplexing divider, in which the input/output terminals of the wavelength multiplexer such as the grating and the arrayed waveguide grating described as the opticalcoupler in the third embodiment are reversed, is used as optical dividers 331–333. By the use of such a constitution, the wavelength-multiplexed optical signal is inputted to input terminals 301–303. The multiplexed wavelength is divided by optical dividers 331–333. The wavelength is converted by wavelength converters 321–329 so that the same wavelength may not be inputted to the same opticalcoupler. The light, whose wavelength is multiplexed so that it may be different from the wavelength of the input terminal, can be outputted to output terminals 311–313. At this time, by the gate switch function of the wavelength converter for use in the present invention, the light can be in a such a state that the light is not outputted from the wavelength converter. The number of wavelength multiplexings of the output light can be increased or reduced.

Other embodiments, which are applications of the first through fifth embodiments, will be described below. The wavelength multiplexing function is used, and the wavelengths of the optical signals of the different input terminals can be multiplexed. Thus, the wavelength-multiplexed optical signal can be distributed to all the output terminals. For example, in the optical switch device of FIG. 2, the optical signal alone of a single wave is inputted to the input terminals. The optical signal is then divided by optical dividers 131–133. The optical signal is thus distributed to all the output terminals. The wavelength of the output optical signal of wavelength converter 121 is set to $\lambda 1$. The wavelength of the output optical signal of wavelength converter 122 is set to $\lambda 2$. The wavelength of the output optical signal of wavelength converter 123 is set to $\lambda 3$. The wavelength of the output optical signal of wavelength converter 124 is set to $\lambda 2$. The wavelength of the output optical signal of wavelength converter 125 is set to $\lambda 3$. The wavelength of the output optical signal of wavelength converter 126 is set to $\lambda 1$. The wavelength of the output optical signal of wavelength converter 127 is set to $\lambda 3$. The wavelength of the output optical signal of wavelength converter 128 is set to $\lambda 1$. The wavelength of the output optical signal of wavelength converter 129 is set to $\lambda 2$. Thus, the wavelengths of all the optical signals of the input terminals are multiplexed. The multiplexed optical signals can be distributed and outputted to the output terminals.

In this case, the wavelength converter is used as the gate switch, whereby all three waves are not multiplexed but two waves alone can be multiplexed. The thus wavelength-multiplexed optical signal can be outputted to the output terminals. For example, the optical signal of the wavelength of $\lambda 1$ is outputted from wavelength converter 121. The optical signal of the wavelength of $\lambda 2$ is outputted from wavelength converter 124. Wavelength converter 127 is turned off. Thus, the wavelengths of the optical signals from input terminals 101, 102 are converted and multiplexed. The converted/multiplexed optical signal can be outputted to output terminal 111.

Figure 5:
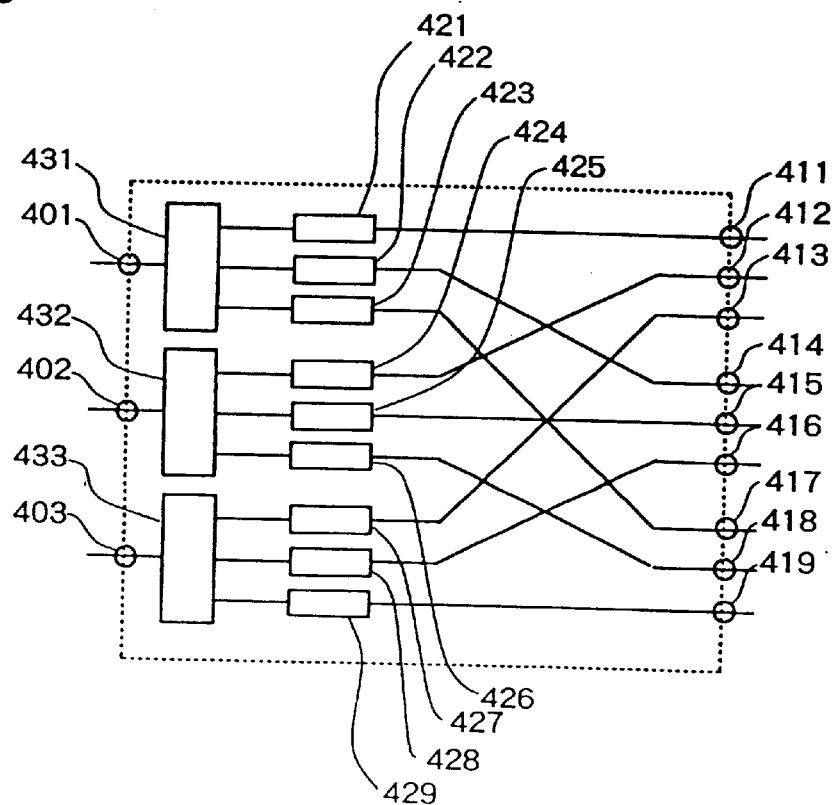
FIG. 5 is a block diagram of the optical switch device having the 3×9 gate type space switch function and the wavelength conversion function according to a sixth embodiment of the present invention.

The optical switch device of a sixth embodiment of the present invention will be described below with reference to FIG. 5. FIG. 5 is a block diagram of the optical switch device having the 3×9 gate type space switch function and the wavelength conversion function according to the sixth embodiment of the present invention.

The optical switch device of the sixth embodiment is constituted as shown in FIG. 5. That is, the opticalcoupler is eliminated from the optical switch device of the first embodiment shown in FIG. 2. The number of the output terminals are increased so that output terminals 412–419 may be provided, whereby a 3-input/9-output type switch is constituted. The outputs of wavelength converters 421–429 are directly connected to output terminals 411–419. An optical coupling is not performed on an output side.

When the wavelength multiplexing divider such as the grating for use in the fifth embodiment is used as optical dividers 431–433, the wavelength-multiplexed optical signal is inputted to input terminals 401–403. The optical signal is spatially divided on the output side, whereby the signal can be outputted to different optical fibers. Thus, the conversion from a wavelength multiplexing system into a spatial division system can be performed. The output wavelengths can be converted and turned on/off.

Figure 6:
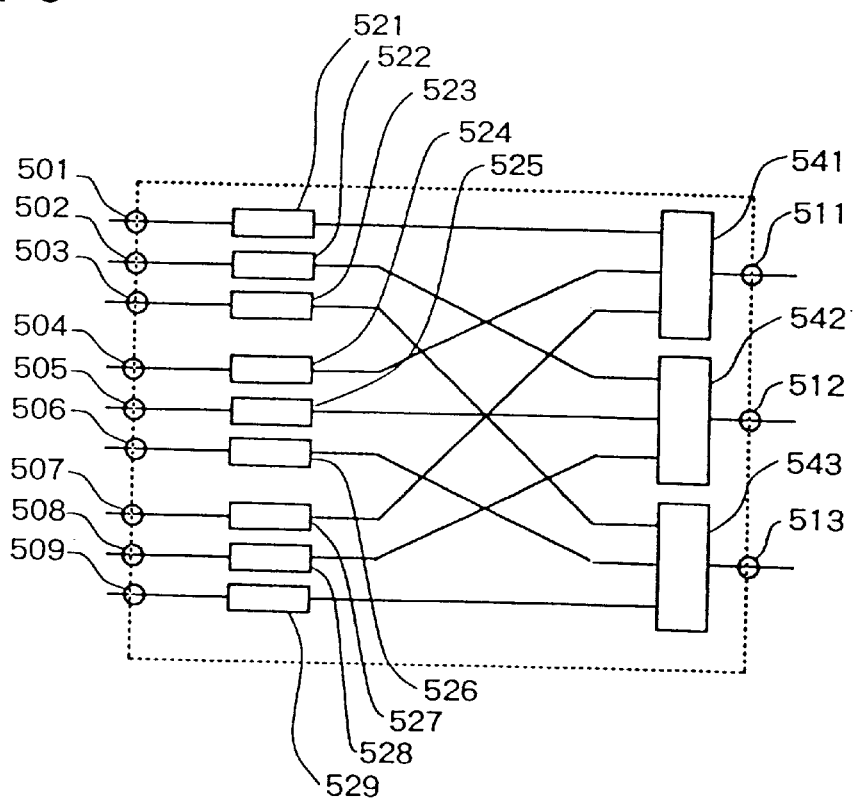
FIG. 6 is a block diagram of the optical switch device having the 9×3 gate type space switch function and the wavelength conversion function according to a seventh embodiment of the present invention.

The optical switch device of a seventh embodiment will be described below with reference to FIG. 6. FIG. 6 is a block diagram of the optical switch device having the 9×3 gate type space switch function and the wavelength conversion function according to the seventh embodiment of the present invention.

The optical switch device of the seventh embodiment is constituted as shown in FIG. 6. That is, the optical divider is eliminated from the optical switch device of the first embodiment shown in FIG. 2. The number of the input terminals are increased so that input terminals 501–509 may be provided. Input terminals 501–509 are directly connected to wavelength converters 521–529, respectively. The outputs of wavelength converters 521–529 are connected to three opticalcouplers 541–543. The outputs of opticalcouplers 541–543 are connected to output terminals 511–513, respectively. In such a manner, a 9-input/3-output type switch is constituted. By this constitution, the inputs from many input terminals are directly wavelength-converted and optically coupled, whereby the inputs can be outputted to a small amount of output terminals.

The optical switch device of an eighth embodiment will be described below with reference to FIG. 6. The fixed/oscillated wavelength converter described in the second embodiment is used as the wavelength converter of the seventh embodiment. Wavelength converters 521–529 are connected to the same opticalcouplers 541–543 so that the output wavelengths thereof may be different from each other. By this constitution, the optical signals of the same wavelength are not superposed and not outputted to a single output terminal. The device can have the wavelength multiplexing function as well as the space switch function and the wavelength switch function.

The optical switch device of a ninth embodiment will be described below with reference to FIG. 6. In the constitution described in the eighth embodiment, the grating and the arrayed waveguide grating described as opticalcouplers 541–543 in the third embodiment are used. By the use of this constitution, the optical signals of the same wavelength are not superposed and not outputted to a single output terminal. The device can have the wavelength multiplexing function as well as the space switch function and the wavelength switch function. Furthermore, the above-described wavelength multiplexer is used, whereby the device can be constituted with low loss. Moreover, the filter action allows the optical noise to be reduced for the following reason. That is, since a certain input terminal of the wavelength multiplexer transmits the fixed wavelength, other wavelengths to be the optical noise are cut off and the remaining wavelength is then outputted to the opticalcoupler.

The optical switch device of a tenth embodiment will be described below with reference to FIG. 6. In the constitution shown in the eighth embodiment, used is the wavelength converter for making the output wavelength tunable described as the wavelength converter in the fourth embodiment. The same controller (not shown) as controller 330 of FIG. 4 for controlling the output wavelength of wavelength converters 521–529 is added to the constitution so that the optical signals of the same wavelength may not be inputted to output terminals 541–543 of the optical switch device. The space switch function and the wavelength switch function can be realized at low cost and with space saved. Furthermore, the wavelength multiplexing function can be realized.

In the seventh through tenth embodiments, the optical signal is spatially divided/multiplexed on the input terminal side, whereby the wavelength-multiplexed signal can be outputted to the output side. In such a manner, the conversion from the spatial division system into the wavelength multiplexing system can be performed. The wavelengths to be multiplexed are changed or extinctions of some wavelengths are performed, so that the wavelength multiplexing is freely performed.

Some embodiments of the present invention are limited so that the wavelength multiplexer such as the grating and the arrayed waveguide grating and the wavelength multiplexing divider may be used as the optical divider and the opticalcoupler which are optical divider means and opticalcoupler means. The divider and the coupler for uniformly dividing and coupling an optical power; the wavelength multiplexer and the wavelength multiplexing divider; an optical polarization multiplexer and an optical polarization multiplexing divider; and an optical time division multiplexer and a time division multiplexing divider may be used for the present invention not specifically limited. As long as they are means for dividing/demultiplexing the light and means for coupling/multiplexing, it should be understood that the present invention can be implemented.

In the embodiments of the present invention, the optical divider and the opticalcoupler are constituted so that they may have 1-input/n-output or n-input/1-output. If the optical divider and the opticalcoupler having n-input/n-output (star coupler), m-input/n-output or the like are used, it should be understood that the present invention can be implemented.

In the embodiments of the present invention, the three-divided optical divider is used as the optical divider. However, if an optical level and the noise are allowable, the present invention is not limited to the three-divided optical divider. An n-divided divider is used whereby an n×n gate switch can be constituted.

In the embodiments of the present invention, the number of n-divided dividers is n. However, the number of divisions of the optical divider does not need to correspond to the number of the optical dividers. For example, a junctor connection (cross connection) is performed by the use of n m-dividers and m n-coupler, whereby an m×n gate switch can be constituted.

In the present invention, the junctor connection (cross connection) is employed. However, even if a connecting method is not the junctor connection shown in FIGS. 2, 4, 5 and 6, it should be understood that the present invention can be implemented.

In the embodiments of the present invention, after the optical signal from a certain input terminal is divided into n by the optical divider, all the signals are connected to the wavelength converters and opticalcouplers. However, even if the signals are not partially connected to the converters and opticalcouplers, it should be understood that the present invention can be implemented.

In the embodiments of the present invention, wavelength converter means, that is, the wavelength converter is constituted by the use of the semiconductor optical amplifier. As long as a wavelength converter has a gate switch function, the wavelength converter is not limited to the semiconductor optical amplifier. For example, even if the semiconductor laser is used as the wavelength converter, the present invention can be implemented without trouble (for example, see the cited reference: T. Shiragaki et al., entitled "Optical Cross-connect System using Fixed-Wavelength Converters to Avoid Wavelength Blocking", First Optoelectronics and Communications Conference (OECC '96), Technical Digest, PD1–5, pp. 10–11, 1996). The semiconductor laser can be used for the following reason. That is, switching of the current shut-off mode and the current supply mode for oscillating the semiconductor laser permits the gate switch operation.

In the embodiments of the present invention, the effect of the cross-gain modulation of the semiconductor optical amplifier is used. However, even if the wavelength converter uses the cross-gain modulation of the semiconductor optical amplifier and the semiconductor optical amplifier such as the fourwave mixing, the present invention can be implemented (the cited references are disclosed in the description of the prior art). All wavelength converters use the output light from the semiconductor optical amplifier as the output of the wavelength converter. Thus, the semiconductor optical amplifier can perform the gate switch operation by switching the current shut-off mode and the current supply mode for obtaining the gain.

In the present invention, in case of an invention not limited to the wavelength to be converted being tunable, whether the output wavelength of the wavelength converter is fixed or tunable, it is obvious that the present invention can be implemented.

In the embodiments of the present invention, the wavelength converter for converting the wavelength with the light unchanged is used as the wavelength converter having the gate switch function. On the other hand, in the wavelength converter for once converting the optical signal into an electric signal and for reconverting the electric signal into the optical signal of same length, the electric switch is added to a section for converting the optical signal signal into the electric signal or a section for converting the electric signal into the optical signal, whereby the gate operation is performed. Even in this case, it is apparent that the present invention can be implemented.

In the embodiments of the present invention, the opticalcoupler and the optical divider are used in single stage. The opticalcouplers and the optical dividers may be connected in cascade connection. Even in this case, it is apparent that the present invention can be implemented.

It is obvious that the optical switch device of the present invention is applicable to an optical switch section (a space switch section and a wavelength switch section) of an optical cross connect node device.

The application of the present invention to an optical highway switch is shown in, for example, FIG. 5 of Japanese Patent Application Laid-open No. 60-263596/1985 in which a gate type optical switch, the wavelength converter, the optical divider and the opticalcoupler are used. However, the device for turning on/off the light output from the wavelength converter is not added to wavelength converters T11–T1n, T21–T2n shown in FIG. 5 of this publication. The invention disclosed in this publication is different from the present invention in the object and the constitution. Unlike the present invention, it is also impossible to realize both of the space switch function and the wavelength switch function. The invention disclosed in this publication is also different from the present invention in the function and the effect.

As described above, in the optical switch device which has heretofore required the space switch section and the wavelength switch section, these sections are integrated with each other. Thus, an SOAG required for the space switch section is unnecessary. Although the wavelength converter is used as the function corresponding to the conventional SOAG, the wavelength switch section conventionally required is unnecessary. Effectively, the cost is thus reduced and a packaging volume is also reduced.

The output wavelengths of the wavelength converters connected to the same opticalcoupler are also allowed to differ from each other. Thus, the optical switch device of the present invention can have the wavelength multiplexing function as well as the space switch function and the wavelength switch function. By the gate operation of the wavelength converter, it is possible to increase/reduce the number of wavelengths of the optical signal to be multiplexed. The optical signal whose wavelength in the input terminal is multiplexed can be also distributed to the output terminals.

The output of the wavelength converter is connected directly to the output terminal except for the opticalcoupler, whereby the spatially divided signal can be outputted to the different optical fibers. When the wavelength multiplexing divider such as the grating is used as the optical divider, the wavelength-multiplexed optical signal can be inputted to the input terminal and the spatially divided signal can be outputted to the output side. In such a manner, the conversion from the wavelength multiplexing system into the spatial division system can be performed. The output wavelengths can be converted and the On/Off operation can be performed.

Without the use of the optical divider, the signals are directly inputted from many input terminals to the wavelength converters, and the signal is outputted via the opticalcoupler. Thus, the spatially divided/multiplexed signal can be inputted to the input terminal by the different optical fiber. The wavelength-multiplexed signal can be then outputted to the output side. In such a manner, the conversion from the spatial division system into the wavelength multiplexing system can be performed. The wavelength to be multiplexed is changed or the extinction is performed, while the wavelength multiplexing can be freely performed.

That is, by applying the present invention, the wavelength conversion function and the space switch function can be prepared without separating the optical switch device into the space switch section and the wavelength switch section in an optical communication network node. The cost can be reduced. The packaging volume can be reduced. Since the wavelength converter and the wavelength coupler are connected to each other and the optical output is outputted, the device has the wavelength multiplexing function. Furthermore, when the wavelength is multiplexed by the use of the wavelength multiplexing function of the present invention, the wavelength converter performs the gate switch operation. Thus, whether or not the wavelength is multiplexed can be freely set. Moreover, when the wavelength is multiplexed by the use of the wavelength multiplexing function of the present invention, because of the wavelength conversion function, the wavelength can be multiplexed so that the same wavelength may not be multiplexed.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. An optical switch device for communication comprising:
   a plurality of optical dividers;
   a plurality of wavelength converters which switch/set a mode for outputting a light and a mode for not outputting the light;
   a plurality of optical couplers;
   a plurality of input terminals; and
   a plurality of output terminals,
   wherein;
   said plurality of input terminals are connected to said plurality of optical dividers,
   said plurality of optical dividers are connected to said plurality of wavelength converters,
   said plurality of wavelength converters are connected to said plurality of optical couplers,
   said plurality of optical couplers are connected to said plurality of output terminals,
   each of said plurality of wavelength converters include:
      a switching section which switches said each wavelength converter between said light outputting mode and said mode for not outputting light; and
      a wavelength converting section which converts input light into a predetermined wavelength.

2. The optical switch device according to claim 1, wherein wavelengths of lights outputted from said plurality of wavelength converters connected to a same one of said plurality of optical couplers are different from each other.

3. The optical switch device according to claim 1, wherein each of said plurality of optical couplers has a plurality of input terminals and a single output terminal,
   said plurality of input terminals of each optical coupler have different/inherent transmittable wavelength properties for light output to said output terminal, and
   the lights outputted from said plurality of wavelength converters connected to said plurality of input terminals have the same wavelength properties as said transmittable wavelength properties.

4. The optical switch device according to claim 1, further comprising:
   a controller which tunes wavelengths of output light from said plurality of wavelength converters so that the wavelengths of lights outputted from said plurality of wavelength converters connected to said plurality of input terminals of a same one of said plurality of optical couplers are different from each other.

5. The optical switch device according to claim 1, wherein each of said plurality of optical dividers outputs wavelength-multiplexed input light as the light of different wavelengths to the spatially different output terminals, and
   said device further comprises a controller which tunes a wavelength of output light from said plurality of wavelength converters so that the wavelengths of the lights outputted from said plurality of wavelength converters connected to said plurality of input terminals of a same one of said plurality of optical couplers are different from each other.

6. An optical switch device for communication comprising:
   a plurality of optical dividers;
   a plurality of wavelength converters which switch/set a mode for outputting a light and a mode for not outputting the light;
   a plurality of input terminals; and
   a plurality of output terminals,
   wherein;
   said plurality of input terminals are connected to said plurality of optical dividers,
   said plurality of optical dividers are connected to said plurality of wavelength converters,
   said plurality of wavelength converters are connected to said plurality of output terminals,
   each of said plurality of wavelength converters include;
      a switching section which switches said each wavelength converter between said light tout putting mode and said mode for not outputting light; and
      a wavelength converting section which converts input light into a predetermined wavelengh.

7. The optical switch device according to claim 6, wherein each of said plurality of optical dividers outputs wavelength-multiplexed input light as the light of different wavelengths to the spatially different output terminals.

8. An optical switch device for communication comprising:
   a plurality of wavelength converters which switch/set a mode for outputting light and a mode for not outputting light;
   a plurality of optical couplers;
   a plurality of input terminals; and
   a plurality of output terminals,
   wherein said plurality of input terminals are connected to said plurality of wavelength converters,
   said plurality of wavelength converters are connected to said plurality of optical couplers, and
   said plurality of optical couplers are connected to said plurality of output terminals,
   each of said plurality of wavelength converters include:
      a switching section which switches said each wavelength converter between said light outputting mode and said mode for not outputting light; and
      a wavelength converting section which converts input light into a predetermined wavelength.

9. The optical switch device according to claim 8, wherein wavelengths of lights outputted from said plurality of wavelength converters connected to a same one of said plurality of optical couplers are different from each other.

10. The optical switch device according to claim 8, wherein each of said plurality of optical couplers has a plurality of input terminals and a single output terminal,
    said plurality of input terminals of each optical coupler have different/inherent transmittable wavelength properties for light outputted to said output terminal, and
    the lights outputted from said plurality of wavelength converters connected to said plurality of input terminals have the same wavelength properties as said transmittable wavelength properties.

11. The optical switch device according to claim 8, further comprising:
    a controller which tunes wavelengths of output light from said plurality of wavelength converters so that the wavelengths of the lights outputted from said plurality of wavelength converters connected to said plurality of input terminals of a same one of said plurality of optical couplers are different from each other.

12. The optical switch device according to claim 1, wherein said wavelength converting section includes:
    a laser which outputs light at said predetermined wavelength;

an optical coupler which couples the light output from said laser with said input light, said coupled light being input into said switching section; and a filter, turned to said laser, for passing only light output from said switching section at said predetermined wavelength.

13. The optical switch device according to claim 12, wherein said switching section includes:

an optical amplifier;

a current or voltage source connected to said optical amplifier;

an on/off switch connected to said current or voltage source; and wherein when said on/off switch switches to on said light outputting mode is initiated and said coupled light is passed to said filter through said optical amplifier, and when said on/off switch switches to off said mode for not outputting light is initiated and said coupled light is not passed to said filter.

14. The optical switch device according to claim 1, wherein each of said plurality of optical couplers is connected to a group of n wavelength converters where n is an integer, said wavelength converters in each group outputting a different wavelength of light, and wherein said optical switch device further includes:

means for controlling said converters so that only one of said wavelength converters in each said group outputs light at any given time.

15. The optical switch device according to claim 13, wherein when an input signal light has a first logical value a gain of said optical amplifier is reduced so that no light from said laser is output, and when the input signal light has a second logical value a gain of said optical amplifier is raised to a level which causes said optical amplifier to output light from said laser.

16. The optical switch device according to claim 1, wherein each of said plurality of optical couplers is connected to a group of n wavelength converters where n is an integer, said wavelength converters in each group outputting a different wavelength of light, and wherein said optical switch device further includes:

means for controlling said converters so that a predetermined number of wavelength converters outputs light and a predetermined number of wavelength converters does not output light in each said group.

\* \* \* \* \*